United States Patent
Chen et al.

(10) Patent No.: US 8,797,519 B2
(45) Date of Patent: Aug. 5, 2014

(54) METHOD OF MEASURING MULTI-MODE FIBER BANDWIDTH THROUGH ACCESSING ONE FIBER END

(71) Applicant: Corning Incorporated, Corning, NY (US)

(72) Inventors: Xin Chen, Corning, NY (US); Jason Edward Hurley, Corning, NY (US); Charles Frederick Laing, Wilmington, NC (US); Anping Liu, Horseheads, NY (US); Jody Paul Markley, Watkins Glen, NY (US); Eric John Mozdy, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/037,912

(22) Filed: Sep. 26, 2013

(65) Prior Publication Data

US 2014/0092380 A1    Apr. 3, 2014

Related U.S. Application Data

(60) Provisional application No. 61/707,219, filed on Sep. 28, 2012.

(51) Int. Cl.
| | | |
|---|---|---|
| *G01N 21/00* | (2006.01) | |
| *G02B 6/028* | (2006.01) | |
| *H04B 10/071* | (2013.01) | |
| *H04B 10/2581* | (2013.01) | |
| *H04B 10/073* | (2013.01) | |
| *G01M 11/00* | (2006.01) | |

(52) U.S. Cl.
CPC ............ *G02B 6/0288* (2013.01); *H04B 10/071* (2013.01); *H04B 10/2581* (2013.01); *H04B 10/0731* (2013.01); *G01M 11/3109* (2013.01)

USPC ........................................................ 356/73.1

(58) Field of Classification Search
CPC ............... G02B 6/0288; G02B 6/0365; G02B 6/03627; G02B 6/02204; G02B 6/02261; G02B 6/02328; G02B 6/02361; G02B 6/028; G02B 6/03605; G02B 6/03683; G02B 6/268; G02B 6/29353; G02B 6/4202; G02B 6/43

See application file for complete search history.

(56) References Cited

U.S. PATENT DOCUMENTS 5,861,970 A *   1/1999   Tatham et al. ................ 398/150
6,400,450 B1 *  6/2002   Golowich et al. ............ 356/73.1

(Continued)

FOREIGN PATENT DOCUMENTS

EP              1705471 A1         9/2006

OTHER PUBLICATIONS

Kolesar et al: "Understanding multimode bandwidth and differential node delay measurements and their applications" 51$^{st}$ International Wire and Cable Symposium of IWCSm Jan. 1, 2002, pp. 453-460, XP009174628.

(Continued)

*Primary Examiner* — Michael P Stafira
(74) *Attorney, Agent, or Firm* — Robert L Carlson (57) ABSTRACT

A method of measuring the bandwidth of a multi-mode optical fiber using single-ended, on-line and off-line approaches and test configurations. The method includes: transmitting a light signal through the first end of a multi-mode fiber toward the second end of the multi-mode fiber, so that a portion of the light signal is reflected by the second end toward the first end of the multi-mode fiber; and receiving the reflected portion of the light signal at the first end of the multi-mode fiber. The method also includes obtaining magnitude and frequency data related to the reflected portion of the light signal at the first end of the multi-mode fiber; and analyzing the magnitude and the frequency data to determine a bandwidth of the multi-mode optical fiber. The length of the multi-mode fiber may also increase over time during testing.

20 Claims, 8 Drawing Sheets

(56) References Cited

U.S. PATENT DOCUMENTS

| 7,746,454 | B2 | 6/2010 | Laing et al. |
| 2002/0101577 | A1 | 8/2002 | Thwing |
| 2008/0145049 | A1* | 6/2008 | Koyamada ............... 398/28 |
| 2011/0054861 | A1* | 3/2011 | Lane ............... 703/2 |
| 2011/0289980 | A1 | 12/2011 | Filippov et al. |

OTHER PUBLICATIONS

T-J Ahn et al: "Optical frequency domain DMD measurement for a multimode optical fiber using a wavelength swept laser", Technical Digest CD-ROM / Conference on Lasers and Electro-Optics, Quantum Electronics and Laser Science Conference, Conference on Photonic Applications, Systems and Technologies: Long Beach Convention Center, Long Beach California USA May 21, 2006, pp. 1-2 XP031394858 ISBN: 978-1-55752-813-1.

Gallawa, R.L., "Fiber Bandwidth Measurement Using Pulse Spectrum Analysis," Appl. Opt., vol. 25, No. 7, pp. 1069-1071, Apr. 1, 1986.

Corsi, Fabrizio, "Continuous-Wave Backreflection Measurement of Polarization Mode Dispersion," IEEE Photonics Technology Letters, 11, 451-453, 1999.

Fiber Reflector: http://www.ozoptics.com/ALLNEW_PDF/DTS0020.pdf.

* cited by examiner

FIGURE 12

METHOD OF MEASURING MULTI-MODE FIBER BANDWIDTH THROUGH ACCESSING ONE FIBER END

CROSS-REFERENCE TO RELATED APPLICATIONS

This application claims the benefit of priority under 35 U.S.C. §119 of U.S. Provisional Application Ser. No. 61/707,219, filed on Sep. 28, 2012, the content of which is relied upon and incorporated herein by reference in its entirety.

BACKGROUND

The disclosure generally relates to measuring the bandwidth of an optical multi-mode fiber (MMF) and, more particularly, relates to methods and configurations for testing an MMF by signal transmission and receipt on one end of the fiber.

Bandwidth is an important attribute of MMF product. Ultimately, bandwidth is used in the optical fiber industry to set the grade of the MMF product. The bandwidth is directly related to how the refractive index profile of the MMF exists in practice compared to the ideal, optimal profile for a given MMF configuration. The bandwidth exhibited by a given MMF is generally very sensitive to even a slight deviation from the ideal, optimal profile.

One method for measuring the bandwidth of an MMF is to apply a light signal at one end of the MMF, receive the transmitted light signal at the other end, and measure bandwidth through the known, differential mode delay (DMD) measurement technique. The DMD method records the time delay pulse using a controlled offset launch from a single mode fiber, and this offset is varied across the face of the fiber under test. Further, data processing is used to convert the time pulses versus offset position into a bandwidth result. The time for each DMD measurement is long, typically about 5-11 minutes.

SUMMARY

According to one embodiment, a method of measuring the bandwidth of a multi-mode optical fiber is provided. The method includes the step of transmitting a light signal through the first end of a multi-mode fiber toward the second end of the multi-mode fiber, so that a portion of the light signal is reflected by the second end toward the first end of the multi-mode fiber. The method further includes the steps of receiving the reflected portion of the light signal at the first end of the multi-mode fiber; and obtaining magnitude and frequency data related to the reflected portion of the light signal at the first end of the multi-mode fiber. The method also includes the step of analyzing the magnitude and the frequency data to determine a bandwidth of the multi-mode fiber.

According to another embodiment, a method of measuring the bandwidth of a multi-mode optical fiber is provided. The method includes the step of transmitting a light signal through the first end of a multi-mode fiber toward the second end of the multi-mode fiber, so that a portion of the light signal is reflected by the second end toward the first end of the multi-mode fiber, and wherein the multi-mode fiber has a length that increases over time. The method further includes the steps of receiving the reflected portion of the light signal at the first end of the multi-mode fiber; and obtaining magnitude and frequency data related to the reflected portion of the light signal and the length of the optical fiber. The method also includes the step of analyzing the magnitude and the frequency data to determine a bandwidth of the multi-mode fiber at a given time.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

While DMD measurements play an important role in MMF manufacturing, there are other occasions where fast bandwidth measurements of fibers in large volumes are needed as a quick quality check or even as a near, real-time feedback for the fiber making process. One approach, described in further detail below, is to transmit a modulated test signal through an MMF to generate intensity versus frequency plots. Results from these tests can be compared to measurements made on prior-made MMFs. MMF bandwidth is then determined by identifying the 3 dB drop point in frequency. Measurements are primarily made using test signals at around 850 nm; however, other wavelengths are feasible, including around 980 nm, 1060 nm, 1310 nm and 1550 nm.

Figure 1:
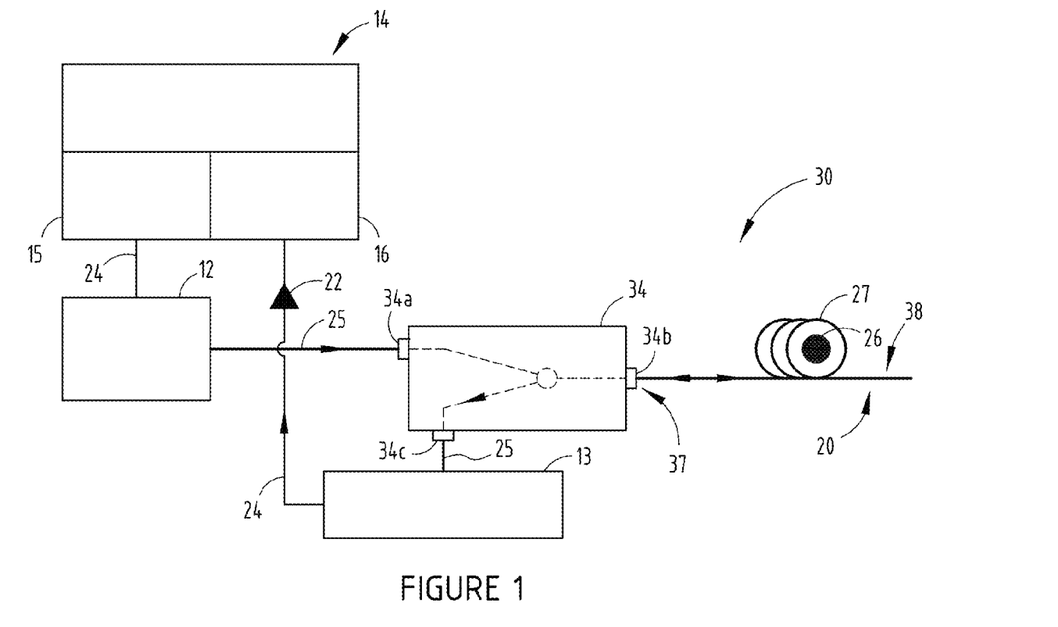
FIG. 1 is a schematic diagram illustrating a single-ended test configuration with a directional coupler for testing the bandwidth of a multi-mode optical fiber according to one embodiment.

One embodiment of a single-ended test configuration for measuring the bandwidth of an MMF is depicted in FIG. 1. In particular, FIG. 1 provides a single-ended test configuration 30 with a directional coupler 34 for testing the bandwidth of a multi-mode optical fiber 20. The single-ended test configuration shown in FIG. 1 relies on test signal transmission and receipt on only one end of the fiber 20.

FIG. 1, in particular, provides a schematic layout of a method for measuring the bandwidth of an optical multi-mode fiber 20. As shown, multi-mode fiber 20 has a first end 37 and second end 38. The fiber 20 includes a coil 27 wrapped around a fiber storage spool 26. The first end of the fiber 37 is coupled to an analog transmitter 12 via a directional coupler 34. The second end of the fiber 38 is not connected to any components. As-tested, fiber 20 is typically configured with a finite length after a drawing process. Fiber 20 may consist of multiple optical fibers arranged in a cable form, for example. Further, fiber 20 can be arranged with a changing length and tested during these changes in length, such as during a drawing operation according to another embodiment. Further details associated with testing fibers during processing are discussed later in connection with the test configurations depicted in FIGS. 8A and 8B, for example.

As further depicted in FIG. 1, the network analyzer 14 provides a sweeping modulating signal to an analog transmitter 12 via cabling 24 connected to frequency modulation port 15 on the analyzer 14. An Agilent Technologies, Inc. network analyzer Model No. ENA 5071C or PNA N5230C may be employed for the network analyzer 14. The electric signal from the network analyzer 14 is converted into an optical signal through the analog transmitter 12. The optical signal is then launched by the transmitter 12 into a fiber connector 25, coupled to the input port 34a of a directional coupler 34. Typically, the transmitter 12 employed in optical MMF testing is a vertical-cavity surface-emitting laser (VCSEL) or a distributed feedback laser (DFB).

Directional coupler 34 then directs the optical signal through receiving port 34b, coupled to the first end of the fiber 37. The optical signal then travels through fiber 20 toward the second end of the fiber 38. There, a portion of the incident light is reflected within fiber 20 back through the coil 27 toward the first end of the fiber 37 and receiving port 34b.

Figure 1A:
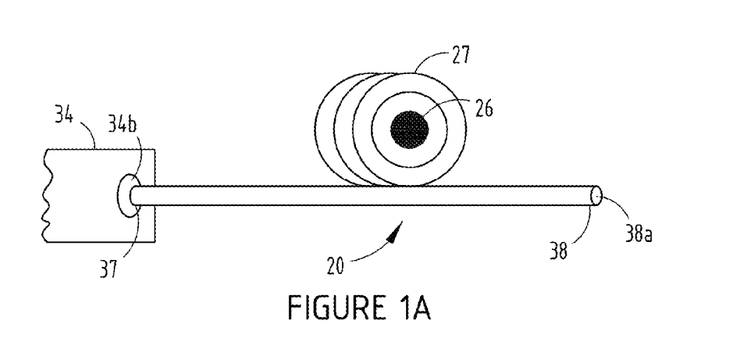
FIG. 1A is an enlarged view of the test fiber depicted in FIG. 3, configured with a cleaved end.

The second end of the fiber 38 may be engineered to facilitate the back-reflection aspect of the embodiment depicted in FIG. 1. For example, the second end of the fiber 38 may be cleaved with a cleave plane 38a (see FIG. 1A) to ensure that some portion of the incident light (at least 4%) will be back-reflected against plane 38a due to Fresnel refraction. It is this back-reflected light that returns to the directional coupler 34 at the receiving port 34b. The Rayleigh scatter from the incident light within fiber 20 will also be back-scattered at the second end of the fiber 38, but this back-scattering is an order of magnitude lower in intensity compared to the back-reflected light from the end interface. Accordingly, the effects of Rayleigh scatter at the second end of fiber 38 are negligible.

Further, the degree of incident light back-reflected at the second end of the fiber 38 may be adjusted by other modifications to the second end of the fiber 38. As discussed above, FIG. 1A is an enlarged view of multi-mode fiber 20, including first and second ends 37 and 38. First end 37 is coupled to directional coupler 34 at receiving port 34b. The second end of fiber 38 contains a cleaved plane 38a. Cleaved plane 38a is preferably oriented substantially normal to the longitudinal axis of fiber 20. A cleaved plane, such as cleaved plane 38a, can be created, for example, by a cut to the second end of the fiber 38 such that the resultant cut plane is substantially normal to the main axis of the fiber. Further, a cleaving tool as is known in the optical fiber industry may be employed to create cleave plane 38a. In addition, optical fibers in certain applications (e.g., in buildings) already possess a cleaved end coupled to a connector that can serve as cleaved plane 38a, thus making them well-suited for test configuration 30.

Figure 1B:
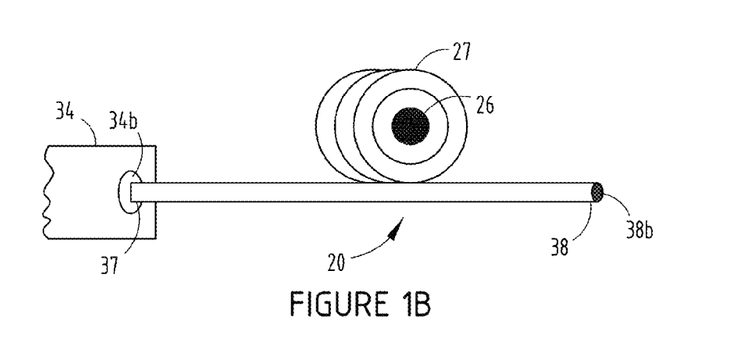
FIG. 1B is an enlarged view of the test fiber depicted in FIG. 3, configured with a fiber light reflector.

Further, cleaved plane 38a may be sufficiently smooth or polished to ensure back-reflection of some portion of the incident light (at least 4%). As depicted in FIG. 1B, the second end of the fiber 38 may be coated with a fiber light reflector 38b to achieve the same effect. Fiber light reflector 38b may comprise an optically, reflective material, such as gold, or another known, fiber reflector device.

The back-reflected test signal is then received at receiving port 34b of the directional coupler 34. Directional coupler 34 then directs the back-reflected test signal through output port 34c to the photo-detector 13 via an optical path, such as cabling 24. Various, known directional couplers may be employed for coupler 34 in this test configuration, provided that they satisfy the prescribed functions. Detector 13 converts the received, back-reflected optical signal back into an electrical signal. The electrical signal is then transmitted through detector 13 via cabling 24 into the detector port 16 of the network analyzer 14. Network analyzer 14 then provides the spectrum magnitude versus frequency data obtained for fiber 20.

Figure 2:
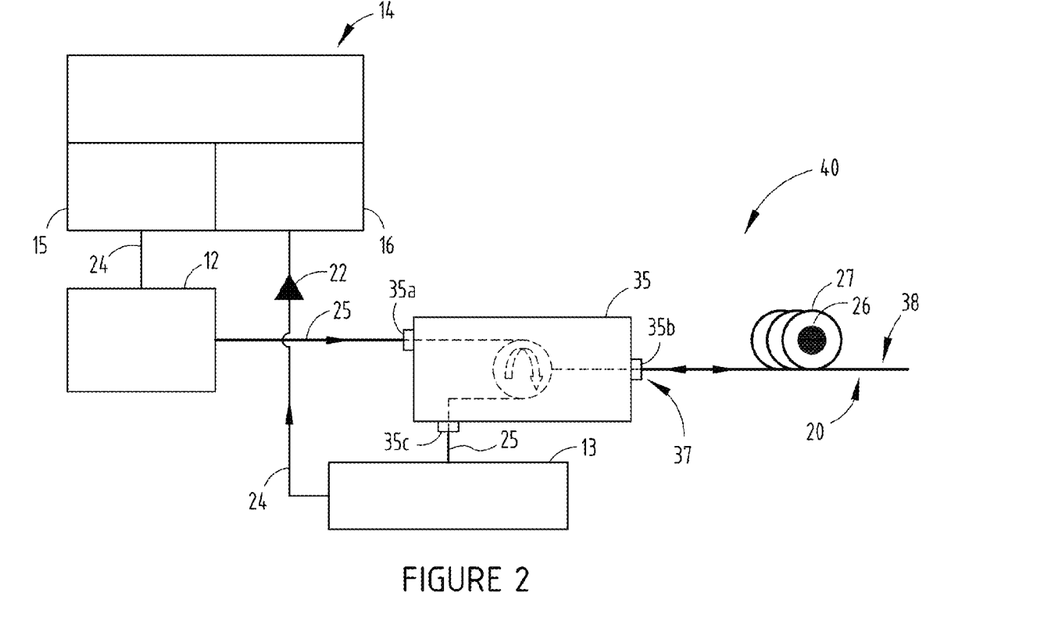
FIG. 2 is a schematic diagram illustrating a single-ended test configuration with an optical circulator for testing the bandwidth of a multi-mode optical fiber according to another embodiment.

FIG. 2 depicts another embodiment of a single-ended test configuration for measuring the bandwidth of an MMF. In particular, FIG. 2 provides a single-ended test configuration 40 with an optical circulator 35 for testing the bandwidth of a multi-mode optical fiber 20. The test configuration 40 depicted in FIG. 2 is identical to the test configuration 30 depicted in FIG. 3, except that configuration 40 relies on an optical circulator 35 to direct incident and back-reflected light within fiber 20 rather than the directional coupler 34 relied on by configuration 30. Optical circulator 35 possesses input, receiving and output ports 35a, 35b and 35c, respectively, that serve the same function as ports 34a, 34b and 34c of the directional coupler depicted in FIG. 1.

As depicted in FIG. 2, optical circulator 35 can be configured and optimized for various wavelengths of interest as employed in the optical fiber industry, such as a wavelength of around 850 nm. Optical circulator 35 is a device that allows light to enter one port and exit another port in a 3-port configuration (i.e., ports 35a, 35b, and 35c). In general, optical circulators, such as circulator 35, are built using polarization rotation or physical beam displacement methodologies. The modulated light, as shown in FIG. 2, is launched into the fiber under test through the port 35a. Light will travel from input port 35a into receiving port 35b. The received, back-reflected light will travel from receiving port 35b to output port 35c into the photo-detector 13. Optical circulators are commercially available in configurations optimized for multi-mode light transmission within MMFs at a wavelength, or wavelengths, of approximately 850 nm, 980 nm, 1060 nm, 1310 nm and 1550 nm. Also note that various, known optical circulators may be employed for circulator 35 in this test configuration, provided that they satisfy the prescribed functions.

In the test configurations depicted in FIGS. 1 and 2, the transmitter 12 is connected to the fiber 20 under test through a fiber connector 25. Since the transmitter 12 is VCSEL-based, most of the light launched into the fiber 20 is directed through the center region of the fiber. When a sufficient number of modes have been excited, the measured spectrum response curve is quite close to a Gaussian shape, comparable to the shape of the spectra observed from testing fibers using the configurations shown in FIGS. 1 and 2. In other circumstances, it may be necessary to test fiber 20 with different incident light launch conditions from transmitter 12, such as an overfill launch condition. The incident light launch conditions used by transmitter 12 can be modified by the use of different VCSEL-based light sources with certain characteristics. For example, transmitter 12 may employ a VCSEL that generates a high incident light intensity near the center of the fiber 20 (hot inside), another VCSEL that generates a high incident light intensity near the outside diameter of the fiber 20 (hot outside), etc. Another approach to varying the incident light launch conditions through transmitter 12 is to insert a launch condition control unit (not shown) after the transmitter 12 in the configurations depicted in FIGS. 1 and 2. These control units have an engineered lens system to ensure that the spot size of the incident light on the fiber 20 at first end 37 can be toggled between a center launch and an overfill launch condition, while maintaining required numerical aperture. The launch control unit should also be able to change the offset angle of the incident light into the first end of the fiber 37 for the creation of different mixtures and combinations of launch modes within fiber 20.

Figure 3:
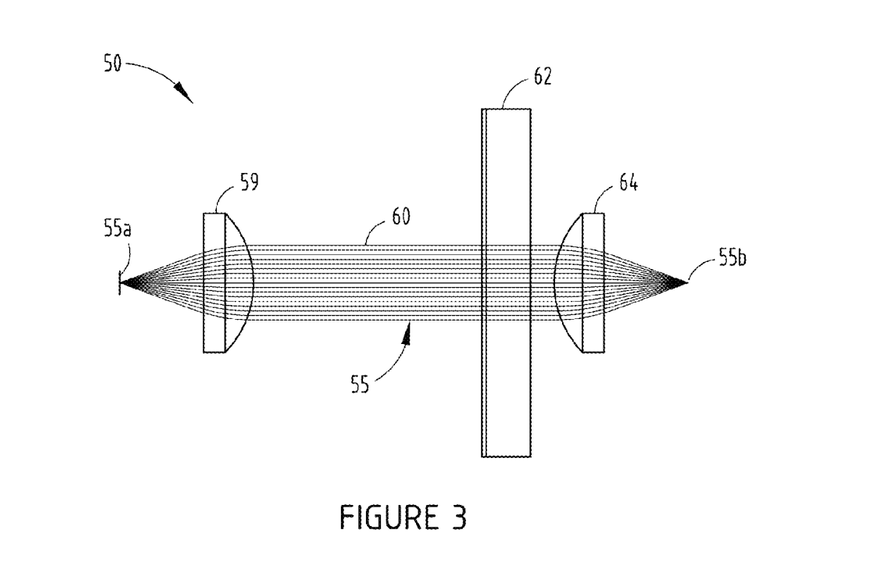
FIG. 3 is a schematic diagram of a mode converter assembly employed in the test configuration according to one embodiment.

To over-fill all possible modes in the fiber 20 tested in configurations 30 and 40 (see FIGS. 1 and 2), a single-mode beam from the light source in transmitter 12 can be converted into a multi-mode optical signal. As shown in FIG. 3, this conversion can be achieved by a mode converter assembly 50. The mode converter assembly 50 may be configured at either end of the fiber connector 25, which connects the transmitter 12 to the directional coupler 34 or the optical circulator 35 in test configurations 30 and 40, respectively. In addition, mode converter assembly 50 may be configured between receiving port 34b of the directional coupler 34 or receiving port 35b of the optical circulator 35 and first end of fiber 37.

As further shown in FIG. 3, mode converter assembly 50 includes an input end 55a and an output end 55b, along with collimation lens 59 and optical lens 64. A special optical element, mode converter filter 62, is arranged between lenses 59 and 64. Mode converter filter 62 possesses a particular microstructure on its surface that redirects the input light beam from 55a (originating from transmitter 12) by changing the phase of each segment of the beam. The microstructure on the surface of filter 62 includes scatter-center units 63 that direct incoming light rays into different directions. The clustering of millions of scatter-center units 63 over a large area in the surface of filter 62 combines to provide the scattering properties of the mode converter filter 62.

Figure 4:
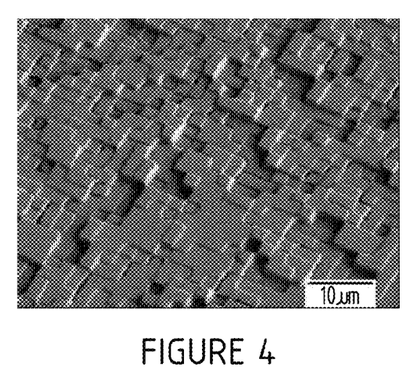
FIG. 4 is a scanning electrode micrograph of the surface of the mode converter filter depicted in FIG. 3.

The typical scatter-center unit 63 of filter 62 is a micro-lens element, as illustrated by the scanning electron micrograph in FIG. 4. To achieve greater than 90% conversion efficiency, each scatter-center unit depicted in FIG. 4 is individually designed to implement a certain light-control task. The surface structure as well as the statistical distribution of scatter-center units is carefully designed and fabricated within the mode converter filter 62. Alternatively, the scatter-center units 63 of filter 62 can be made of electro-optic elements with different refractive indices. Each element can be controlled by an electric signal. A typical example of such a device is a liquid crystal phase modulator 65. The modulator 65 can consist of a large number of transparent, small cells 66 filled with a solution of liquid crystal (LC) modules and function as an array of variable wave plates. Two parallel faces of the walls of each cell 66 can be coated with a transparent conductive film so that a voltage can be applied across each cell 66. The orientation of the LC molecules can be determined by an alignment layer in the absence of an applied voltage. When an AC voltage is applied, the molecules will change from their default orientation based on the applied root mean squared value of the voltage. Hence, the phase offset in a linearly polarized beam of light can be actively controlled by varying the applied voltage.

Figure 5:
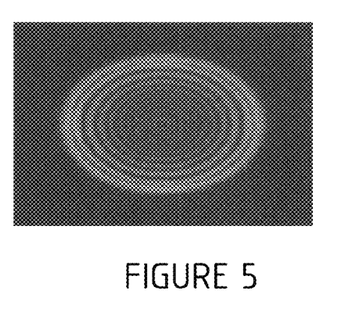
FIG. 5 is a simulated intensity profile in 2D of an incident circular beam converted by the mode converter assembly depicted in FIG. 3 into an elliptical beam.
Figure 5A:
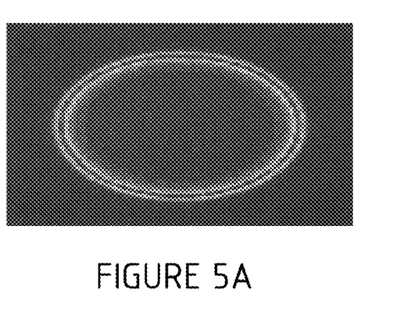
FIG. 5A is an experimentally-generated intensity profile in 2D of an incident circular beam converted by the mode converter assembly depicted in FIG. 3 into an elliptical beam.
Figure 5B:
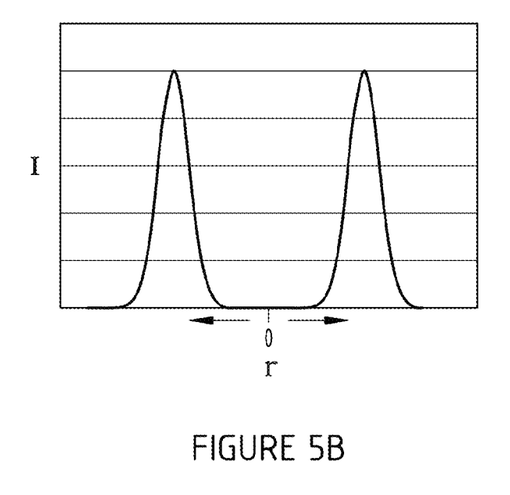
FIG. 5B is an experimentally-generated intensity profile as a function of fiber radius of an incident circular beam converted by the mode converter assembly depicted in FIG. 3 into an elliptical beam.

FIG. 5 provides a simulated intensity profile in 2D of an incident circular beam converted by the mode converter assembly 50 depicted in FIG. 3 into an elliptical beam. An incident circular beam from a transmitter 12 employed in test configurations 30 and 40 (see FIGS. 1 and 2) is converted to an elliptical beam, as demonstrated by the simulated profile shown in FIG. 5. This effect is accomplished by the insertion of the mode converter assembly 50 as discussed earlier. In addition, experimental results from the use of a mode converter assembly 50 in a single-ended MMF bandwidth test configuration as depicted in FIGS. 1 and 2 are depicted in FIG. 5A. The elliptical profile observed in FIG. 5A is comparable to the simulated profile shown in FIG. 5. Further, the plot of intensity versus radius of fiber 20 shown in FIG. 5B demonstrates the existence of intensity peaks toward the outer circumference of the fiber.

In particular, the converter assembly 50 redistributes power from the original, incident circular beam to the edge of the fiber 20, and the lenses then re-image the beam into an elliptical ring. In this case, the beam intensity profile is controlled by the mode converter filter 62 while the beam size is controlled by the lenses 59 and 64. As a result, using a converter assembly 50 in test configurations 30 and 40 can change the power intensity without changing the beam shape. Further, changing the spacing between lenses 59 and 64 distance leads to different beam sizes without changing the beam intensity profile.

In addition, the diffuser elements (not shown) may be used in the test configurations 30 and 40 depicted in FIGS. 1 and 2. Diffusers are not sensitive to beam alignment and do not affect the polarization of the input beam. They can be made out of fused silica, silicon, plastic, or other materials and can cover wavelengths from 193 nm to 20 µm. Newly developed diffusers can be made with minimal hot spots (often less than 1%) with efficiencies as high as 95%. In a sophisticated test configuration comparable to those depicted in FIGS. 1 and 2, a number of mode converter assemblies 50 with different profiles can be used. They can be mounted on a conventional, multi-filter holder, making them easy to swap without requiring realignment of the optical components.

Under certain circumstances, the optical signals that reach the photo-detector 13 in the configurations depicted in FIGS. 1 and 2 have a low intensity. Additional amplification schemes can be used to mitigate data detection problems associated with low beam intensity. For example, a one-stage electrical amplifier 22 may be introduced in the cabling 24 after the photo-detector 13. This amplifier can significantly boost the signal that reaches detector port 16 of the network analyzer 14.

For example, the CSI V226 transmitter employed as transmitter 12 in experiments conducted using the test configurations depicted in FIGS. 1 and 2 has 4 dBm optical power at 850 nm. By adding a one-stage electrical amplifier 22 to the configuration, bandwidth measurements can still be made after 30 dB of optical attenuation through a variable optical attenuator (VOA) (not shown) inserted just before the photo-detector 13 in test configurations 30 and 40.

In another embodiment, a spatial light modulator, such as a liquid crystal spatial light modulator (LC SLM) can be used to alter the mode conditions of the MMF or the light launch condition into the fiber 20 under test. The liquid crystal light modulator allows the user to alter the optical phase of each pixel of incident light. Referring generally to FIG. 1, a single mode laser, such as a DFB laser, serves as transmitter 12 and is connected to a polarization controller (not shown), which aligns the state of the polarization of the incident light going into a $LiNbO_3$ modulator (not shown) that is connected to network analyzer 14. The output single mode light from transmitter 12 is converted into a collimated beam through a lens (not shown). The collimated beam passes through the LC SLM (not shown) and the phase of the light beam is spatially adjusted before being focused down into the receiving MMF, e.g., first end 37 of fiber 20. By manipulating the phase across the beam, the light intensity profile of the light launched into the MMF is adjusted. By changing the phase of each liquid crystal pixel, the light profile launched into the MMF (e.g., fiber 20) can be altered as programmed by a computer. Alternatively, an LC SLM that operates in a reflective mode can be employed in this test configuration.

The test configurations 30 and 40 depicted in FIGS. 1 and 2 were also evaluated using a Gennum, Inc. receiver optical sub-assembly (ROSA) for photo-detector 13. The Gennum ROSA includes a built-in limiting amplifier. Note that the limiting amplifier has a non-linear response when the light signal level is high, but behaves linearly when the signal level is low. Further, accurate bandwidth measurements could be made using a CSI V226 transmitter for transmitter 12, even when the optical attenuation reached as high as 45 dB.

In another embodiment, it is also feasible to further boost the incident light signal from transmitter 12 by using an optical amplifier operating around 850 nm (not shown). Such devices are commercially available with 10 dB or greater gain when used in collaboration with single-mode light sources. The use of an optical amplifier in test configurations 30 or 40 after the transmitter 12 requires the selection of a single-mode VCSEL or DFB laser for the transmitter 12. An optical amplifier may be optionally used in combination with a one-stage electric amplifier 22 to mitigate a high degree of optical signal loss during single-ended, MMF bandwidth testing.

Figure 6:
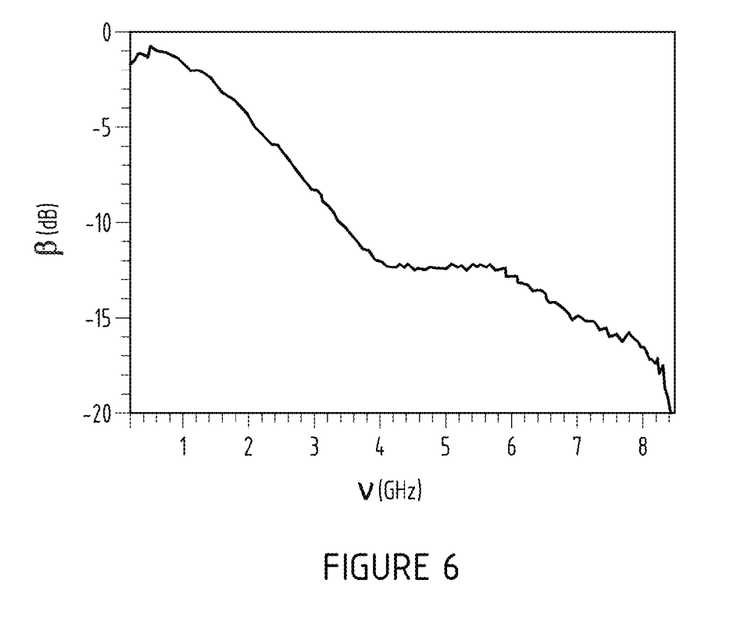
FIG. 6 is a plot of attenuation as a function of frequency for a test signal from a multi-mode optical fiber tested with the configuration depicted in FIG. 1.

Bandwidth measurements were made using an optical MMF tested with the single-ended test configuration 30 depicted in FIG. 1. The measured spectrum from these tests is shown in FIG. 6. Note that the launched light passes each portion of the fiber 20 twice by traveling from the first end 37 to the second end of the fiber 38, and then reflected back toward the first end of the fiber 37. The measured bandwidth is the bandwidth over this round-trip condition, a trip length of at least two times the length of fiber 20.

Since MMFs are bandwidth-limited filters, when a higher frequency is used to modulate the transmitter (e.g., transmitter 12), the transmitted signal suffers from increasing attenuation or loss at higher frequencies. Typically, the measured spectrum of multi-mode optical fiber 20 follows a Gaussian shape. Accordingly, the related bandwidth for fiber 20 can be readily retrieved through identifying the frequency when the attenuation reaches 3 dB optical (defined by 10*log( ) operator) or 6 dB electrical (defined by 20*log( ) operator) in the spectrum.

As shown in FIG. 6, the measured round-trip total bandwidth is the frequency in GHz (υ) corresponding to a 6 dB attenuation of the electrical test signal (β). The y-intercept is approximately—2 dB in FIG. 6; accordingly, the bandwidth corresponds to 3.1 GHz at an attenuation level of approximately—8 dB. The single-trip bandwidth ($b_{out}$ or $b_{return}$) is a function of the round-trip bandwidth ($b_{round-trip}$) according to Equation 1 below:

$$\frac{1}{b_{out}^2} + \frac{1}{b_{return}^2} = \frac{1}{b_{round-trip}^2} \qquad (1)$$

Since the bandwidth incurred at the outgoing trip ($b_{out}$) and the return trip ($b_{return}$) are equal to each other and the round trip bandwidth ($b_{round-trip}$) is measured, the outgoing bandwidth and return bandwidth is calculated at 4.4 GHz. This is the absolute bandwidth for the fiber 20 under test for the specific launch condition from the transmitter 12. When converted into a scaled bandwidth for a fiber length of 1 km, the measured bandwidth of fiber 20 is 1.13 GHz*km. This value is very close to bandwidth data collected on similar fibers using a conventional DMD measurement technique. This confirms the validity of the round-trip bandwidth measurement configuration depicted in FIGS. 1 and 2.

Figure 7:
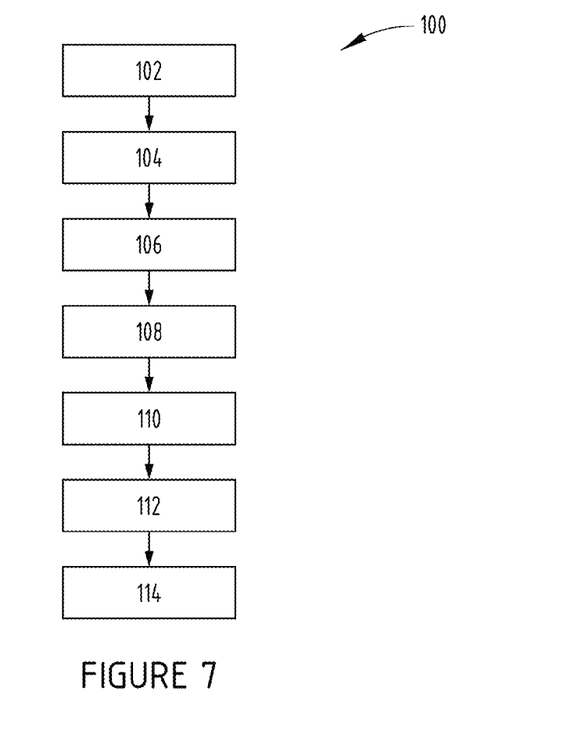
FIG. 7 is a flow chart of a method of testing the bandwidth of an optical multi-mode fiber according to one embodiment with a single-ended test configuration such as depicted in FIGS. 1 and 2.

FIG. 7 provides a flow chart of a method of testing the bandwidth of an optical multi-mode fiber according to one embodiment with a single-ended, test configuration such as depicted in FIGS. 1 and 2. The single-ended method 100 for testing the bandwidth of an optical MMF includes steps 102 through 114 as shown in FIG. 7. Step 102 is for providing a multi-mode optical fiber (e.g., fiber 20 used in test configurations 30 and 40) with a first end, and a second end that is configured to reflect light transmitted from the first end of the fiber. Step 104 is for transmitting a light signal (e.g., from transmitter 12) through the first end of the fiber toward the second end of the fiber, wherein a portion of the light signal is reflected by the second end toward the first end of the fiber. Step 106 is for receiving the reflected portion of the light signal at the first end of the fiber (e.g., at receiving port 34b of a directional coupler 34, receiving port 35b of an optical circulator 35, etc.). Step 108 relates to obtaining magnitude (i.e., electrical signal attenuation) and frequency data related to the reflected portion of the light signal at the first end of the fiber (e.g., at the photo-detector 13 and detector port 16 of a network analyzer 14).

Method 100 further includes Step 110 for analyzing the magnitude and the frequency data to determine a bandwidth of the multi-mode optical fiber. As discussed earlier, the bandwidth of an optical MMF tested in test configurations 30 and 40 reflects a round-trip through the MMF, over two times the length of the fiber. Accordingly, Step 112 is for calculating the single-trip bandwidth using the round-trip bandwidth obtained in Step 110 and Equation (1) above. Finally, the method ends with Step 114 for improving or modifying the conditions used to manufacture or otherwise process the MMFs based on the obtained bandwidth data. For example, the bandwidth data for a given MMF can be used to improve the processing conditions for subsequently-produced MMFs. As another example, bandwidth data can be generated for an MMF or multiple MMFs arranged in cable-form to ensure that the cabling process has not adversely affected the bandwidth performance of the fibers.

Bandwidth measurements can be very sensitive to even a slight deviation from the ideal, optimal profile of an MMF. Therefore, it is possible to fine-tune the process parameters associated with manufacturing MMFs during the draw process and improve the overall grade of the fibers during production. For example, draw process parameters related to fiber tension, temperature, draw speed or even fiber diameter all can impact the overall bandwidth of a given fiber. It is therefore particularly advantageous to test the bandwidth of MMFs during processing in real-time or near, real-time to effect rapid improvements to the grade of the fibers by slight process parameter adjustments.

Figure 8A:
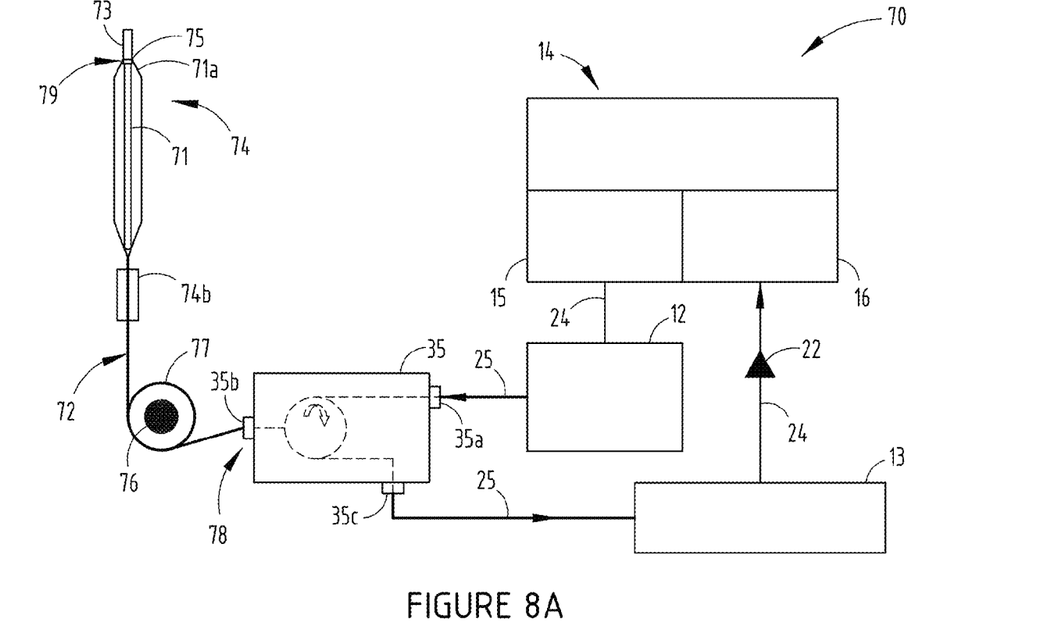
FIG. 8A is a schematic diagram illustrating a single-ended, test configuration for testing the bandwidth of a multi-mode optical fiber online with a mirror at the second end of the fiber according to another embodiment.
Figure 8B:
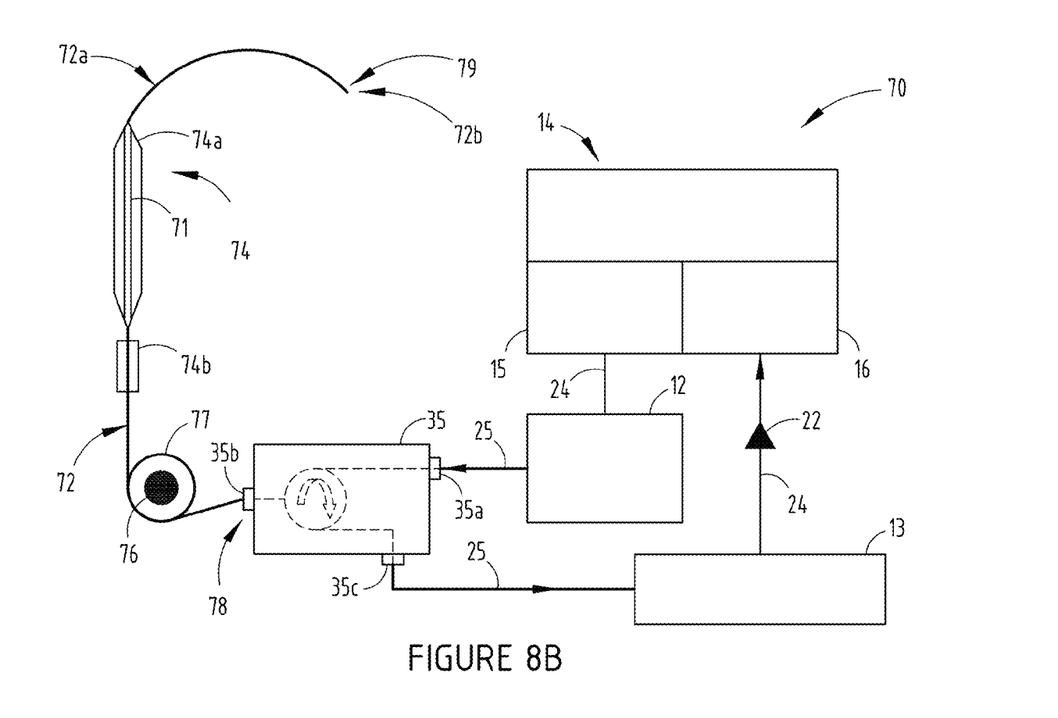
FIG. 8B is a schematic diagram illustrating a single-ended test configuration for testing the bandwidth of a multi-mode optical fiber online with a fiber light reflector at the second end of the fiber according to another embodiment.

FIGS. 8A and 8B provide two single-ended, test configuration embodiments for testing the bandwidth of a multi-mode optical fiber online (i.e., during fiber manufacturing or other processing). Both configurations are arranged in a similar fashion as the single-ended configurations depicted in FIGS. 1 and 2, but the test configurations 70 depicted in FIGS. 8A and 8B include fiber processing apparatus and the length of the MMF changes as a function of time. Also note that the test configurations 70 as shown in FIGS. 8A and 8B rely on an optical circulator 35. Nevertheless, a directional coupler 34 can be substituted for the circulator 35 in these configurations.

One embodiment of a single-ended test configuration for measuring the bandwidth of an MMF online is depicted in FIG. 8A. In particular, FIG. 8A provides a single-ended test configuration 70 with an optical circulator 35 for testing the bandwidth of a multi-mode optical fiber draw 72. Comparable to the single-ended, MMF bandwidth testing embodiment depicted in FIG. 1, the online bandwidth testing embodiment depicted in FIG. 8A relies on test signal transmission and receipt on only one end of the fiber draw 72.

FIG. 8A, in particular, provides a schematic layout of a method for measuring the bandwidth of an optical multi-mode fiber draw 72. As shown, multi-mode fiber draw 72 has a first end 78 and a second end 79. The fiber draw 72 includes a coil 77 wrapped around a fiber support spool 76. The fiber support spool 76 includes a rotary adapter that allows endless rotation between ends 78 and 79 of the fiber draw 72, eliminating or minimizing twisting effects during spooling as the fiber draw 72 is processed (e.g., its length increases). Further, the fiber support spool 76 takes up fiber draw 72 as it is processed such that first end 78 remains in a constant position at its connection to port 35b. To the extent fiber support spool 76 cannot accommodate fiber draw 72 after a period of processing in which the length of draw 72 has substantially increased, spool 76 can be removed, and a new spool can be started to facilitate additional bandwidth testing. One such system that can be employed as fiber support spool 76 with a rotary adapter is disclosed in U.S. Patent Application Publication No. 2009/0244523, hereby incorporated by reference in this application.

In addition, a fiber cooling device 74b is optionally arranged between the coil 77 and end of the preform 74. The cooling device can be used to reduce temperature-related optical losses associated with the portion of the fiber draw 72 that emanates from the preform 74 and exhibits very high temperatures from the draw itself. The cooling device 74b can reduce the temperature of the hot fiber by 100-400° C. without significantly altering the attenuation properties of the MMF fiber draw 72. Preferably, cooling device 74b is placed in close proximity to the end of preform 74 that is closest to first end 78 of fiber draw 72.

The first end of the fiber draw 78 is coupled to an analog transmitter 12 via an optical circulator 35. The second end of the fiber draw 79 is not connected to any components. As shown, the second end of the fiber draw 79 is encompassed within the glass preform 74 and core cane 71. A glass handle 73 is located at the end of the core cane 71. Further, a reflector 75 (e.g., a mirrored internal surface) is configured within a clear region of the core cane 71a. Accordingly, the length of fiber draw 72 increases over time during processing as it is formed into coil 77 over fiber support spool 76. The various components used to extend the fiber draw 72 during processing into a long, MMF are known and are not shown in FIG. 8A.

As further depicted in FIG. 8A, the network analyzer 14 provides a sweeping modulating signal to an analog transmitter 12 via cabling 24 connected to frequency modulation port 15 on the analyzer 14. The electric signal from the network analyzer 14 is converted into an optical signal through the analog transmitter 12. The optical signal is then launched by the transmitter 12 into a fiber connector 25, coupled to the input port 35a of the optical circulator 35. Optical circulator 35 then directs the optical signal through receiving port 35b, coupled to the first end of the fiber draw 78. The optical signal then travels through fiber draw 72 toward the second end of the fiber 79. There, a portion of the incident light is reflected within fiber draw 72 back through the coil 77 toward the first end of the fiber 78 and receiving port 35b.

The second end of the fiber draw 79 is engineered to provide the back-reflection aspect of the embodiment depicted in FIG. 8A. Essentially, the incident light within fiber draw 72 is launched into the molten portion of the draw 72 with no cladding. The light then enters the core cane 71 and the preform 74, and then continues toward the second end of the draw 79. As the light travels through the core cane 71 and preform 74, it remains in a guided form because the preform 74 acts as a waveguide. The light is then back-reflected at the second end of the draw 79. For example, the second end of the fiber 79 may be configured with a reflector 75 (e.g., a mirrored internal surface) to ensure that a substantial percentage of the incident light will be back-reflected against the reflector 75 due to Fresnel refraction. It is this back-reflected light that returns to the optical circulator 35 at the receiving port 35b. The Rayleigh scatter from the incident light within fiber draw 72 will also be back-scattered at the second end of the fiber 79, but this back-scattering is an order of magnitude lower in intensity compared to the back-reflected light from the end interface. Accordingly, the effects of Rayleigh scatter at the second end of fiber 79 are negligible.

In the embodiment depicted in FIG. 8B, however, the incident light back-reflection at the second end of the fiber draw 79 is accomplished with a different configuration. In all other respects the embodiment depicted in FIG. 8B is comparable to the configuration depicted in FIG. 8A. As shown in FIG.

8B, preform 74 includes a tapered region 74a on the end of the preform 74 away from the first end of the draw 78. Emanating out of tapered region 74a is a bare fiber 72a (coated or uncoated), attached to the fiber draw 72. This bare fiber 72a terminates with a fiber light reflector 72b. The fiber light reflector 72b may consist of a cleaved plane comparable to the cleaved plane 38a shown in FIG. 1A; an optically, reflective material, such as gold; or another known, fiber reflector device comparable to the fiber light reflector 38b shown in FIG. 1B. If a cleaved plane is used for the fiber light reflector 72b, it should be oriented substantially normal to the longitudinal axis of bare fiber 72a. Further, the cleaved plane should be sufficiently smooth or polished to ensure back-reflection of some portion of the incident light (at least 4%).

For the embodiments depicted in both FIGS. 8A and 8B, the back-reflected test signal is then received at receiving port 35b of the optical circulator 35. Optical circulator 35 then directs the back-reflected test signal through output port 35c to the photo-detector 13 via cabling 24. Detector 13 converts the back-reflected optical signal back into an electrical signal. The electrical signal is then transmitted through detector 13 via cabling 24 into the detector port 16 of the network analyzer 14. Network analyzer 14 then provides the spectrum magnitude versus frequency data obtained for fiber draw 72.

Also note that use of the optical circulator 35 (or a directional coupler 34) can result in some loss in the intensity of the back-reflected signal. Roughly, 3 dB of loss may be incurred within optical circulator 35 as the incident light passes from port 35a to port 35b. Further, the back-reflected optical signal may incur another approximately 3 dB of loss when this light passes from receiving port 35b to output port 35c before reaching the photo-detector 13. Nevertheless, the test configuration 70 takes advantage of the improved sensitivities of currently available photo-detector and network analyzer devices.

Bandwidth measurements can be made using an optical MMF draw 72 tested with the single-ended test configurations 70 depicted in FIGS. 8A and 8B. The measured spectrum shown in FIG. 6 corresponding to an MMF tested in a single-ended test configuration 30 (as shown in FIG. 1) is expected to correspond to results from online bandwidth tests on MMFs performed using configuration 70 (as shown in FIGS. 8A and 8B). Note that the launched light passes each portion of the fiber draw 72 twice by traveling from the first end 78 to the second end of the fiber 79, and then reflected back toward the first end of the fiber 78. The measured bandwidth is the bandwidth over this round-trip condition, a trip length of at least two times the length of the fiber draw 72.

Unlike the test configurations 30 and 40 depicted in FIGS. 1 and 2, the test configuration 70 involves testing fiber draw 72 as the length of the draw increases over time. Hence, the round-trip total bandwidth is measured over a period of time in which the length of the fiber draw 72 increases; accordingly, the measurement is influenced by this change in length. The single-trip bandwidth ($b_{out}$ or $b_{return}$) is a function of the round-trip bandwidth ($b_{round-trip}$) according to Equation 1, as discussed earlier.

A few practical factors should be considered when making bandwidth measurements on fibers, e.g., fiber draw 72, that change in length during testing. First, the online measurement is performed when the fiber draw 72 is being drawn. Typical draw speed at an MMF manufacturing facility is 10-15 m/s and each frequency response measurement is taken within approximately 0.1-1 s. Consequently, the fiber length is changed by a few meters during the test. Note that 1-15 m of MMF has little effect on the total fiber bandwidth that is obtained with a fiber length of at least 300 m and to up to 10-20 km. Fiber movement and fiber length changes during the measurement can cause overall changes and local fluctuations to the spectrum curve. However, this effect is typically within a small range and does not severely affect the data quality for obtaining bandwidth associated with optical MMFs. Additional data smoothing and averaging can further be conducted to improve the measurement accuracy, consistency, and the ability to detect weaker signals.

A second factor in making online bandwidth measurements according to the embodiments depicted in FIGS. 8A and 8B is the fiber attenuation exhibited during the bandwidth testing. Typically, approximately 2.2 dB/km of attenuation exists at an incident test light signal wavelength of 850 nm. Since these tests are conducted with a round trip condition, the light passes each portion of the fiber twice. Accordingly, each km can contribute around 4.4 dB of signal loss during the test. This is a limiting factor on the overall fiber length that can be tested as eventually the test signal losses are too high to obtain meaningful testing data. As outlined above, an electrical amplifier 22 can be added to the test configuration 70 to boost signal loss associated with optical attenuation.

Figure 9:
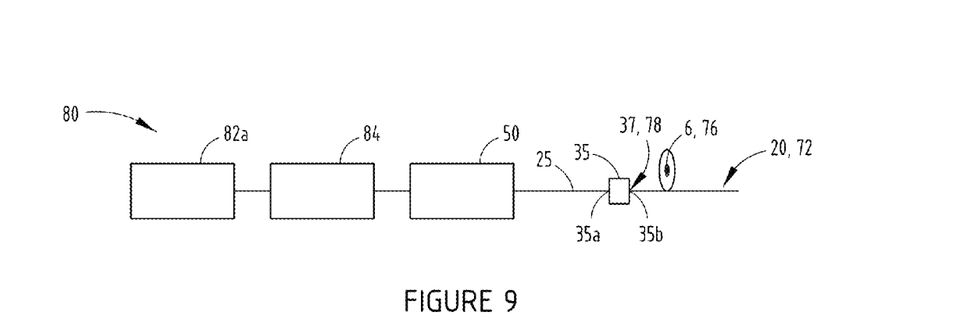
FIG. 9 is a schematic diagram illustrating a high-power light source assembly according to one embodiment.

On the other hand, as shown in FIG. 9, a high-power light source assembly 80 can be employed in test configuration 70 for use in transmitter 12, delivering a higher optical power. A relatively straightforward way to increase the light source power is to deploy an optical amplifier before the signal launched into the fiber draw 72 under test. As shown, the light beam from a single-mode laser 82a with signal modulation, such as a VCSEL, is amplified with a single mode amplifier 84 and the modulation frequency of the single mode laser 82a is controlled by a high frequency controller (not shown). The beam then passes through a mode converter assembly 50 (see FIGS. 3 and 4 and the corresponding description above) that converts the single mode beam into a multimode configuration, leaving all fiber modes in a state of excitation. The signal then travels into optical circulator 35 through input port 35a and into fiber draw 72 via fiber connector 25, as outlined in FIG. 9 and FIGS. 8A and 8B. The high-power light source assembly 80 can also be used with a bandwidth testing configuration that relies on a directional coupler 34. Further, high-power light source assembly 80 can be employed in test configurations 30 and 40, as discussed in connection with FIGS. 1 and 2.

Figure 10:
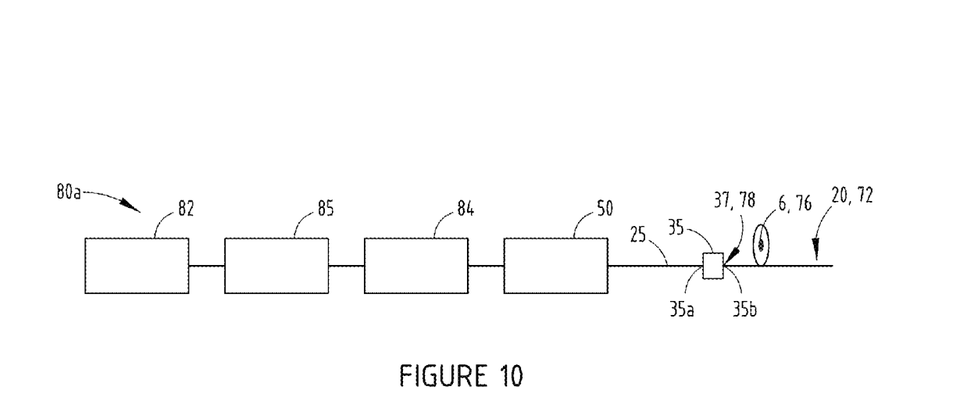
FIG. 10 is a schematic diagram illustrating a high-power light source assembly according to another embodiment.

FIG. 10 provides an alternative high-power light source assembly 80a. Here, the signal beam from the single mode laser 82 passes through a fiber-based, optical modulator 85 which can achieve a high extinction on/off ratio at high frequencies (i.e., >10 GHz). As used herein, "extinction ratio" is the ratio of the ON signal to the OFF signal, often expressed in dB units. Then, the pulsed signal is amplified by a single mode amplifier 84 and launched into the multimode fiber (e.g., fiber draw 72 via fiber connector 25) after the mode converter assembly 50.

The benefit of using a single-mode laser 82, 82a, such as a single mode VCSEL or a single mode DFB laser, is that it can greatly improve overall measurement performance. For example, single mode lasers 82, 82a have a narrow spectral width and stable transverse mode distribution. However, the approaches depicted in FIGS. 9 and 10 can be modified by using a multi-mode VCSEL when cost and other aspects are more important than performance.

The test configurations 70 depicted in FIGS. 8A and 8B directly measure the accumulated round trip bandwidth up to certain fiber length. The local or distributed fiber bandwidth is a direct measure of the fiber bandwidth property. This value can be determined in a couple of ways. Through measurements obtained in single-ended bandwidth test configurations (e.g., test configurations 30, 40 and 70), the spectrum curve exhibits a shape comparable in appearance to a Gaussian-shaped curve. The normalized Gaussian spectrum function may be represented by the following equation:

$$H(0,l,f)=e^{-f^2/(2\sigma_f^2)} \qquad (2)$$

The fiber bandwidth (BW) may be determined as the frequency at the half-width at half maximum according to the following equation:

$$BW=(\tfrac{1}{2})FWHM_f=\sigma_f\sqrt{2\ln 2} \qquad (3)$$

As more fiber is drawn (e.g., as part of the fiber draw 72), the new fiber is considered as a concatenation of the fiber with length, l, at a previous moment and the newly drawn fiber up to the current moment with added length, Δl. The bandwidth of the two segments of the fiber are labeled as b(0,l) and b(l, l+Δl) respectively. However, when multimode mode fibers with different bandwidth properties are cascaded, it is important to assess how they should be added together. One way to link the bandwidth of different pieces together is to assume that they are totally independent of each other, comparable to cascading two Gaussian filters. Accordingly, the total bandwidth of the two segments of the fiber b(0, l+Δl) with total length of l+Δl may be determined by the following equation:

$$\frac{1}{b(0,l)^2} + \frac{1}{b(l,l+\Delta l)^2} = \frac{1}{b(0,l+\Delta l)^2} \qquad (4)$$

The bandwidth of the newly drawn fiber with length of Δl between positions l and l+Δl may be represented by the following equation:

$$b(l,l+\Delta l) = \frac{1}{\sqrt{\frac{1}{b^2(0,l)} - \frac{1}{b^2(0,l+\Delta l)}}} = \frac{b(0,l)b(0,l+\Delta l)}{\sqrt{b^2(0,l) - b^2(0,l+\Delta l)}} \qquad (5)$$

Also, since the light signal travels through each portion of the fiber draw 72 twice, the bandwidth is actually accumulated through two times of the fiber length. Consequently, b(0, l) is actually the bandwidth over two times the overall length, 2l. Thus, the scaled bandwidth to 1 km is for the local segment from l to l+Δl, as governed by the following equation:

$$B(l,l+\Delta l)=b(l,l+\Delta l)\times 2l \qquad (6)$$

In other situations, or as an alternative embodiment, the bandwidth of different segments of the fiber draw 72 may instead follow the following equation:

$$\frac{1}{b(0,l)} + \frac{1}{b(l,l+\Delta l)} = \frac{1}{b(0,l+\Delta l)} \qquad (7)$$

Equation (7) is more applicable to practical situations when the difference between one portion of the fiber draw 72 and another portion is relatively minor. Note that Equation (7) holds true when the two segments of the fiber draw 72 have the same mode group delay properties. In such a case, the bandwidth up to length l is determined by the 1 km bandwidth, B, according to the following equation:

$$b(0,l)=B/l \qquad (8)$$

The bandwidth of each segment of the fiber draw 72 from l to l+Δl can also be calculated using a different algorithm. The frequency response for fiber draw 72 from 0 to l is given as H(0, l, f). Accordingly, the frequency response from l to l+Δl may be given by the following equation:

$$H(l,l+\Delta l,f) = \frac{H(0,l+\Delta l,f)}{H(0,l,f)} \qquad (9)$$

In the units of dB, the spectrum for H(l, l+Δl, f) (dB) may be calculated from the following equation:

$$H(l,l+\Delta l,f)(dB)=H(0,l+\Delta l,f)(dB)-H(0,l,f)(dB) \qquad (10)$$

Figure 11:
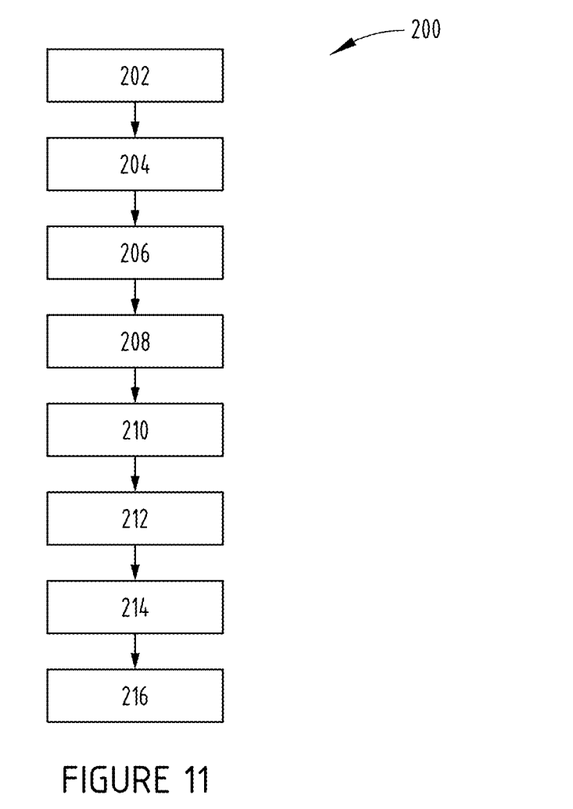
FIG. 11 is a flow chart of a method of testing the bandwidth of an optical multi-mode fiber online according to one embodiment with a single-ended test configuration such as depicted in FIGS. 8A and 8B.

FIG. 11 provides a flow chart of a method of testing the bandwidth of an optical multi-mode fiber online according to the single-ended, test configuration embodiments depicted in FIGS. 8A and 8B. The single-ended, online MMF bandwidth method 200 includes steps 202 through 216 as shown in FIG. 11. Step 202 is for providing a multi-mode optical fiber (e.g., fiber draw 72 used in test configuration 70) with a first end 78, and a second end 79 that is configured to reflect light transmitted from the first end of the fiber draw 78. Step 204 is for transmitting a light signal (e.g., from transmitter 12) through the first end of the fiber draw 72 toward the second end of the fiber 79, wherein a portion of the light signal is reflected by the second end 79 toward the first end of the fiber draw 78. Step 206 is for receiving the reflected portion of the light signal at the first end of the fiber draw 78 (e.g., at receiving port 34b of a directional coupler 34, receiving port 35b of an optical circulator 35, etc.). Step 208 relates to obtaining magnitude (i.e., electrical signal attenuation) and frequency data related to the reflected portion of the light signal at the first end of the fiber 78 (e.g., at the photo-detector 13 and detector port 16 of a network analyzer 14).

Method 200 further includes Step 210 for analyzing the magnitude and the frequency data to determine a bandwidth of the multi-mode optical fiber draw 72. As discussed earlier, the bandwidth of an optical MMF fiber tested in test configuration 70 reflects a round-trip through the MMF, over two times the length of the fiber. Accordingly, Steps 212 and 214 are for calculating the single-trip bandwidth and local fiber bandwidth using the round-trip bandwidth obtained in Step 210. Steps 212 and 214 can make use of Equations (2) through (10) above, for example. Finally, the method ends with Step 216 for improving or modifying the conditions used to manufacture or otherwise process the MMFs based on the obtained bandwidth data. For example, the bandwidth data for a given MMF can be used to improve the processing conditions for subsequently-produced MMFs. As another example, bandwidth data can be generated for an MMF or multiple MMFs arranged in cable-form to ensure that the cabling process has not adversely affected the bandwidth performance of the fibers.

The online bandwidth measurement results can be used as feedback for optimizing the process for manufacturing the MMFs. In particular, the results can be used for draw parameter control, include any of the following parameters: draw tension, draw temperature, fiber outer diameter, and draw speed. Through the bandwidth feedback and continuous adjustment, the MMF bandwidth is tuned into higher and more optimal values.

Figure 11A:
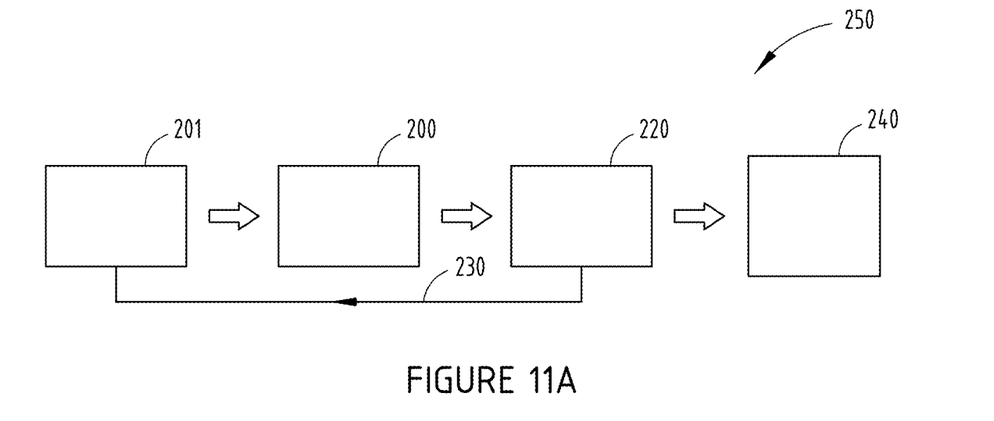
FIG. 11A is a flow chart depicting the optimization of a process for manufacturing multi-mode optical fibers based on testing the bandwidth of a multi-mode fiber online using a single-ended, test configuration such as depicted in FIGS. 8A and 8B.

A flow chart provided in FIG. 11A illustrates the MMF draw optimization process 250. An MMF is first drawn according to Step 201 with a given length. Bandwidth measurements are made online according to Step 200 (comparable to the Method 200 outlined in FIG. 11 and corresponding description) during the processing of the MMF. These bandwidth results are then used in Step 220 as feedback for the drawing process.

The goal of the draw parameter tuning in Step 220 is to slow down the growth of the absolute bandwidth as compared to that set by the average bandwidth. This approach is employed rather than focusing on a reduction in the overall bandwidth over a longer length for fiber draw 72. Equation (9) can be particularly helpful for providing feedback. Instead of using Equation (9) as a precise equation to figure out the bandwidth of newly drawn segments of the MMF, it can be used as a "measure of the bandwidth" of newly drawn fiber. In this way, Equation (9) provides the feedback to the on-the-draw adjustment by helping drive the "measure of the bandwidth' as high as possible, exemplified by Step 240, as more fibers are drawn during processing.

Another aspect of calculating the 'distributed' bandwidth is that it is possible to slide a "window" through different locations of the fiber draw 72. This is done by obtaining the total bandwidth from the zero position to the end of the window, and the total bandwidth from the zero position to the beginning of the window. Accordingly, a smaller window of fiber can be assessed for bandwidth rather than measuring the local bandwidth number over several hundred meters of fiber length. By using the sliding "window," the distributed bandwidth can be measured more continuously and with more spatial resolution.

Figure 12:
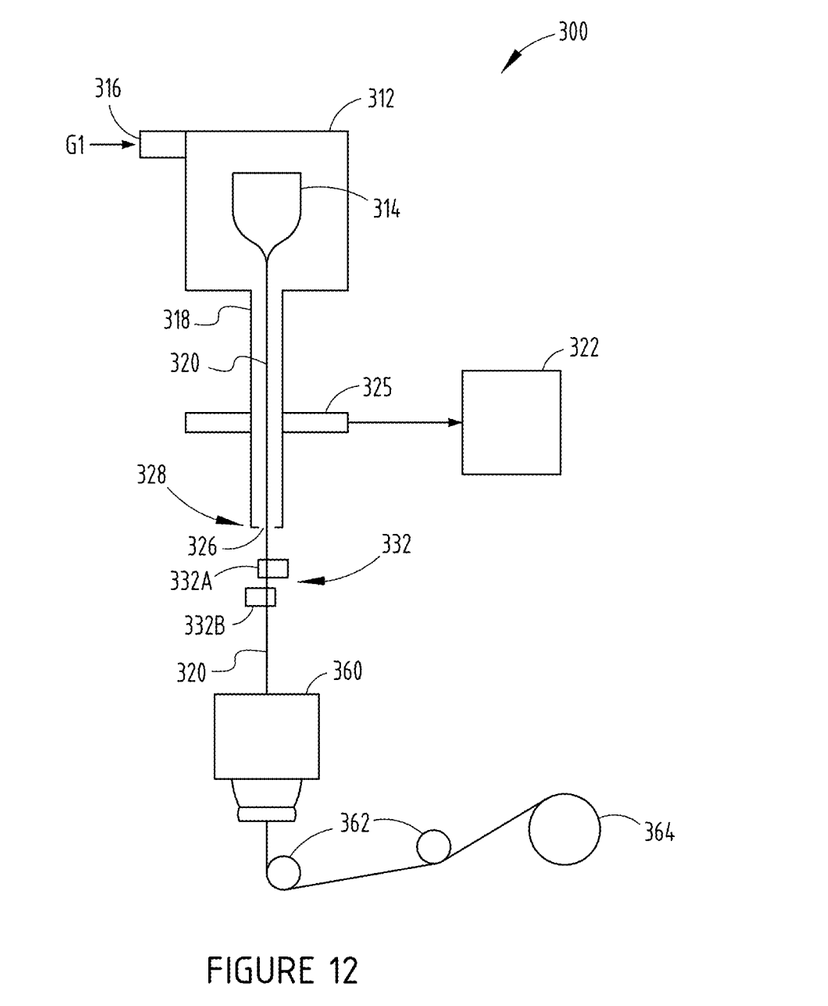
FIG. 12 is a schematic diagram illustrating an optical fiber production system employing a linear non-contact fiber centering device.

As shown in FIG. 12, an optical MMF production system 300 can be optimized using the online bandwidth measurements techniques and configurations discussed above for the production of MMFs. Here, MMF production system 300 employs a linear, non-contact fiber centering device. The details of such a system are disclosed in FIG. 1 of U.S. application Ser. No. 13/091,362, and the corresponding description in its specification. This disclosure is incorporated by reference in this application. Also note that the optical fiber production system 10, furnace 12, etc. in FIG. 1 of U.S. application Ser. No. 13/091,362 corresponds to the MMF production system 300, furnace 312, etc. in FIG. 12 of this application. Essentially, various optical fiber production systems, such as system 300 shown in FIG. 12, can be optimized for the production of MMFs using the single-ended, online testing configurations and approaches discussed above.

It will be apparent to those skilled in the art that various modifications and variations can be made without departing from the spirit or scope of the claims.

What is claimed is:

1. A method of measuring bandwidth of a multi-mode optical fiber, comprising the steps:
   transmitting a light signal through the first end of a multi-mode fiber toward the second end of the multi-mode fiber, so that a portion of the light signal is reflected by the second end toward the first end of the multi-mode fiber;
   receiving the reflected portion of the light signal at the first end of the multi-mode fiber;
   obtaining magnitude and frequency data related to the reflected portion of the light signal at the first end of the multi-mode fiber; and
   analyzing the magnitude and the frequency data to determine a bandwidth of the multi-mode fiber.

2. The method according to claim 1, further comprising the step:
   directing the reflected portion of the light signal to a photo detector via a directional coupler.

3. The method according to claim 1, further comprising the step:
   directing the reflected portion of the light signal to a photo detector via an optical circulator.

4. The method according to claim 1, wherein the second end of the multi-mode fiber is cleaved substantially orthogonal to the long axis of the fiber to reflect light transmitted from the first end of the multi-mode fiber.

5. The method according to claim 1, wherein the second end of the multi-mode fiber is coated with an optically reflective material to reflect light transmitted from the first end of the multi-mode fiber.

6. The method according to claim 5, wherein the second end of the multi-mode fiber is coated with gold to reflect light transmitted from the first end of the multi-mode fiber.

7. The method according to claim 4, wherein the multi-mode fiber is deployed in a building.

8. The method according to claim 3, wherein the optical circulator is optimized to direct light at a wavelength or wavelengths of at least one of, approximately, 850 nm, 980 nm, 1060 nm, 1310 nm and 1550 nm.

9. The method according to claim 7, wherein the second end of the multi-mode optical fiber is connected to an optical connector.

10. The method according to claim 1, wherein the multi-mode optical fiber comprises a plurality of fibers arranged as a cable.

11. The method according to claim 1, wherein the light signal comprises a single launch mode and the step of transmitting a light signal through the first end of the multi-mode fiber toward the second end of the multi-mode fiber comprises the step of converting the single launch mode into a plurality of launch modes.

12. The method according to claim 1, wherein the step of transmitting a light signal through the first end of the multi-mode fiber toward the second end of the multi-mode fiber comprises the step of operating a single mode laser to transmit the light signal, and the step of receiving the reflected portion of the light signal comprises the step of amplifying the reflected portion of the light signal.

13. A method of measuring bandwidth of a multi-mode optical fiber, comprising the steps:
   transmitting a light signal through the first end of a multi-mode fiber toward the second end of the multi-mode fiber, so that a portion of the light signal is reflected by the second end toward the first end of the multi-mode fiber, wherein the multi-mode fiber has a length that increases over time;
   receiving the reflected portion of the light signal at the first end of the multi-mode fiber;
   obtaining magnitude and frequency data related to the reflected portion of the light signal and the length of the multi-mode fiber; and
   analyzing the magnitude and the frequency data to determine a bandwidth of the multi-mode fiber at a given time.

14. The method according to claim 13, further comprising the step:
   directing the reflected portion of the light signal to a photo detector via a directional coupler.

15. The method according to claim 13, further comprising the step:
   directing the reflected portion of the light signal to a photo detector via an optical circulator.

16. The method according to claim 13, wherein the second end of the multi-mode fiber is coated with an optically reflective material to reflect light transmitted from the first end of the multi-mode fiber.

17. The method according to claim 16, wherein the second end of the multi-mode fiber is coated with gold to reflect light transmitted from the first end of the multi-mode fiber.

18. The method according to claim 13, further comprising the step:
   directing the length of the multi-mode fiber to wind on a fiber support spool.

19. The method according to claim 15, wherein the optical circulator is optimized to direct light at a wavelength or wavelengths of at least one of, approximately, 850 nm, 980 nm, 1060 nm, 1310 nm and 1350 nm.

20. The method according to claim 13, wherein the step of transmitting a light signal through the first end of the multi-mode fiber toward the second end of the multi-mode fiber comprises the step of operating a single mode laser to transmit the light signal, and the step of receiving the reflected portion of the light signal comprises the step of amplifying the reflected portion of the light signal.

* * * * *